(12) United States Patent
Fortier

(10) Patent No.: US 11,578,533 B2
(45) Date of Patent: Feb. 14, 2023

(54) STEP LADDER DEVICE ALLOWING THE USER TO STAND AND WORK SAFELY AND COMFORTABLY ON THE UPPER STEPS OF A STEP LADDER

(71) Applicant: Guy Fortier, St Augustine, FL (US)

(72) Inventor: Guy Fortier, St Augustine, FL (US)

( * ) Notice: Subject to any disclaimer, the term of this patent is extended or adjusted under 35 U.S.C. 154(b) by 419 days.

(21) Appl. No.: 16/737,495

(22) Filed: Jan. 8, 2020

(65) Prior Publication Data

US 2020/0217134 A1 Jul. 9, 2020

Related U.S. Application Data

(60) Provisional application No. 62/810,545, filed on Feb. 26, 2019, provisional application No. 62/789,681, filed on Jan. 8, 2019.

(51) Int. Cl.
*E06C 1/22* (2006.01)
*E06C 7/14* (2006.01)
*F16B 7/10* (2006.01)

(52) U.S. Cl.
CPC ............ *E06C 1/22* (2013.01); *E06C 7/14* (2013.01); *F16B 7/105* (2013.01)

(58) Field of Classification Search
CPC .............. E06C 1/22; E06C 7/14; F16B 7/105
See application file for complete search history.

(56) References Cited

U.S. PATENT DOCUMENTS

| 2,481,581 | A |  | 9/1949 | Hartvig |  |
|---|---|---|---|---|---|
| 2,887,260 | A |  | 5/1959 | Mckinnie |  |
| 3,857,460 | A |  | 12/1974 | Nini |  |
| 4,311,209 | A |  | 1/1982 | Primerano et al. |  |
| 4,926,964 | A |  | 5/1990 | Herrin |  |
| 5,074,378 | A |  | 12/1991 | Studer |  |
| 5,544,718 | A | * | 8/1996 | Schumacher | E06C 7/14 182/141 |
| 5,584,357 | A |  | 12/1996 | Gugel et al. |  |
| 5,590,739 | A |  | 1/1997 | High et al. |  |
| 5,740,883 | A |  | 4/1998 | Trank |  |
| 5,791,437 | A |  | 8/1998 | Figliuzzi |  |
| 5,913,380 | A |  | 6/1999 | Gugel et al. |  |
| 5,941,344 | A | * | 8/1999 | Spadaro | E06C 7/14 248/210 |
| 5,950,972 | A | * | 9/1999 | Irish | E06C 7/14 248/210 |
| 8,033,362 | B1 |  | 10/2011 | Cull |  |
| 8,186,481 | B2 |  | 5/2012 | Moss et al. |  |

(Continued)

*Primary Examiner* — Anita M King

(74) *Attorney, Agent, or Firm* — Dunlap Bennett & Ludwig, PLLC

(57) ABSTRACT

A step ladder device for improving the safe working elevation of a step ladder is provided. The step ladder device includes a working ladder portion that terminates in a rigid working tray providing a safety grab bar. The step ladder device is dimensioned and adapted to piggyback on to the step ladder so that the working ladder portion slidably moves in a coplanar orientation relative to the underlying step ladder, which enables the working tray to be locked in one of a plurality of selective working elevations relative to the underlying step ladder. As a result, the user can embrace the safety grab bar and balance themselves while standing on the upper rungs of the underlying step ladder or the lower rungs afforded by the working ladder portion.

4 Claims, 4 Drawing Sheets

(56) References Cited

U.S. PATENT DOCUMENTS

| | | |
|---|---|---|
| 2005/0121261 A1 | 6/2005 | Moss et al. |
| 2008/0164097 A1 | 7/2008 | Eriksson |
| 2008/0185223 A1 | 8/2008 | Lem |
| 2010/0116592 A1 | 5/2010 | Clements et al. |
| 2017/0130529 A1 | 5/2017 | Reyes |
| 2018/0094487 A1* | 4/2018 | Ellis .................. E06C 7/14 |

* cited by examiner

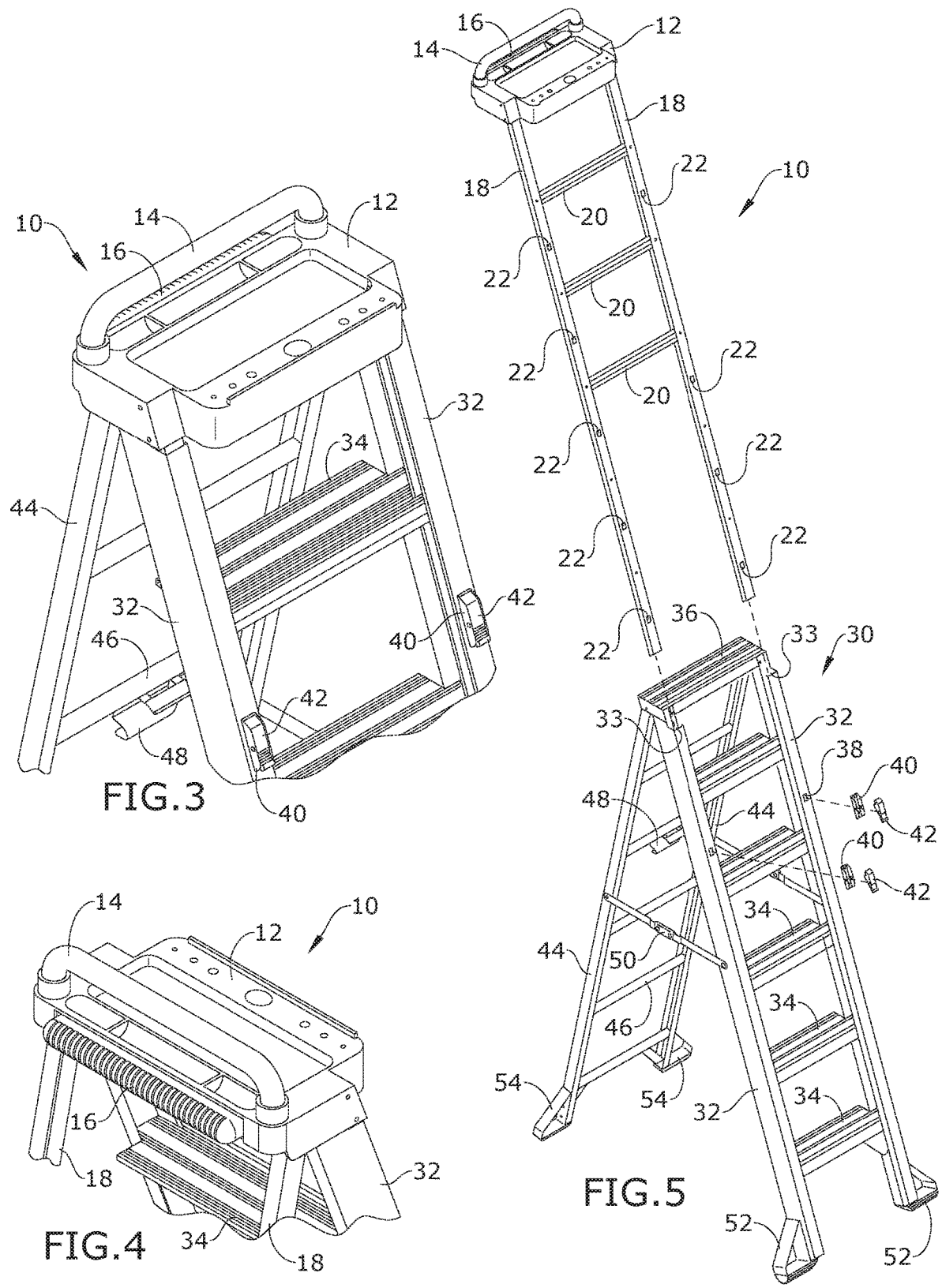

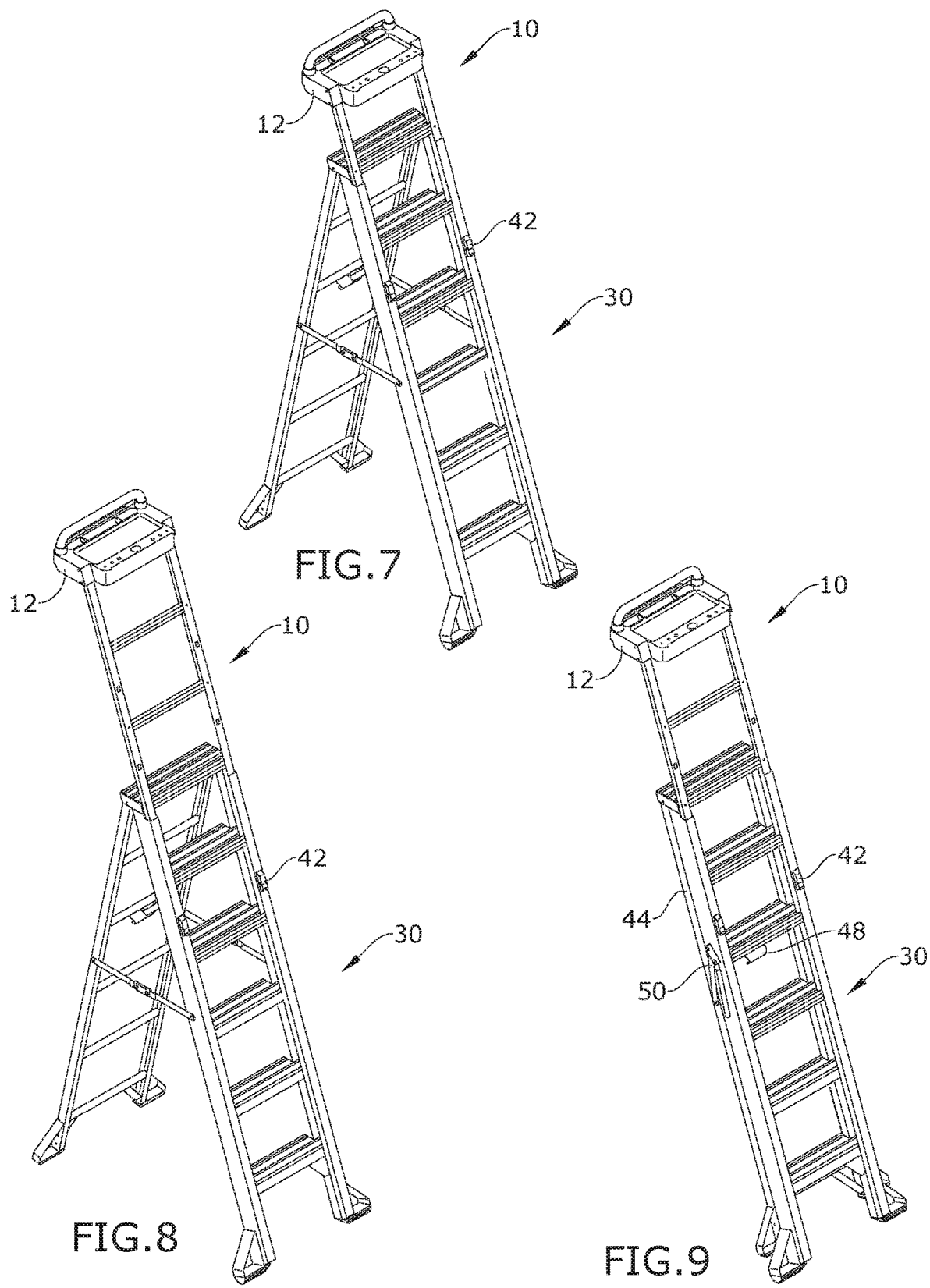

STEP LADDER DEVICE ALLOWING THE USER TO STAND AND WORK SAFELY AND COMFORTABLY ON THE UPPER STEPS OF A STEP LADDER

CROSS-REFERENCE TO RELATED APPLICATION

This application claims the benefit of priority of U.S. provisional application Nos. 62/789,681, filed 8 Jan. 2019, and 62/810,545, filed 26 Feb. 2019, the contents of which are herein incorporated by reference.

BACKGROUND OF THE INVENTION

The present invention relates to ladders and, more particularly, a step ladder device allowing the user to stand and work safely and comfortably on the upper steps of the step ladder.

A step ladder provides more stability than a traditional ladder, but the downside is that the height a user can operably attain by way of the step ladder is more limited than a standard ladder. In fact, step ladder manufacturers prohibit user from standing on the higher steps for safety reason, by writing on the step ladder the warning: "Do not stand above the $2^{nd}$ step from the top."

Specifically, it is not safe to work from the last rung of the step ladder as there is no means to keep one's balance. Moreover, since the upper body of a user is typically elevated above the top of the step ladder, it may be difficult to hold onto the step ladder while trying to reach away therefrom even though the user is not utilizing the top rung. Furthermore, since the working tray of a step ladder is fixed at its top, as the user goes up the working tray becomes farther and farther away, less handy and less able to aid the user in securing one's balance.

Unfortunately, deaths and injuries happen every day as a result of people ignoring the warning and standing on the highest steps in order to reach further. No products or devices have been invented yet to secure the numerous people standing on the highest rungs of step ladders.

A step ladder can be used as a ladder but the conversion procedure may be complicated. As a result, in order to safely work with the step ladder acting as a ladder, the user has to buy a longer step ladder, which takes more room to transport and to store.

As can be seen, there is a need for a step ladder device allowing the user to stand and work safely and comfortably from the upper rungs of the base step ladder and above. Furthermore, the step ladder device operatively associates with the step ladder so that the combination acts as a ladder.

The step ladder device includes a movable working portion having a series of rungs that terminates with a working tray providing a grab bar. The working portion is selectively movable relative to the base step ladder, allowing a user to elevate the working tray relative to the base step ladder so that the user can utilize the grab bar for stability and balance when working from the upper rungs of the step ladder. Additionally, the step ladder device enables the base step ladder to become a ladder, wherein the step ladder device acts as the upper frame with rungs that the user can climb above the highest rung of the base step ladder.

In short, a six-foot step ladder typically can be used only as a six-foot ladder with approximately four feet of working rungs, while the present invention allows a six-foot step ladder to be used as a ten-foot ladder with eight-feet of working rungs, simply by pushing the movable working portion. As a result, the present invention has the potential to bring more security and more working satisfaction to users through a simpler design.

SUMMARY OF THE INVENTION

In one aspect of the present invention, a step ladder device for improving a safe working elevation of a step ladder, providing the following: a working ladder portion having an elongated frame extending between a proximal end and a distal end; a plurality of rungs spaced apart within the elongated frame; a working tray rigidly connected to the distal end; a grab bar fixed along an upper surface of the working tray; and a cavity provided along a lower surface of the working tray.

In another aspect of the present invention, a method of improving a safe working elevation of a step ladder includes the following: providing the step ladder having a front leg frame that terminates at a top portion; providing the above-mentioned step ladder device; attaching two rail extrusions to the front leg frame, one rail extrusion on each side thereof, wherein the two rail extrusions operatively associate with the step ladder device so that the working ladder portion slidably moves between a contracted position and one of a plurality of extended positions relative to the front leg frame, and wherein the contracted position the top portion nests in the cavity; and a safety device located on one of the two rail extrusions, wherein the safety device is unidirectional preventing the working ladder portion from moving downwardly when engaged.

These and other features, aspects and advantages of the present invention will become better understood with reference to the following drawings, description and claims.

BRIEF DESCRIPTION OF THE DRAWINGS

FIG. 3 is a detailed top front perspective view of an exemplary embodiment of the present invention;

FIG. 4 is a detailed top rear perspective view of an exemplary embodiment of the present invention;

FIG. 5 is an exploded perspective view of an exemplary embodiment of the step ladder device 10 of the present invention;

FIG. 7 is a perspective view of the step ladder device 10 in an extended position with the base step ladder 30 in an expanded condition;

FIG. 8 is a perspective view of the step ladder device 10 in an extended position with the base step ladder 30 in an expanded condition; and FIG. 9 is a perspective view of the step ladder device 10 in an extended position with the base step ladder 30 in a collapsed condition wherein the step ladder device 10 enables the underlying base step ladder 30 to act as a longer ladder, and wherein the rungs 20 of the step ladder device 10 can be climbed by the user above a top rung 36 of the base step ladder 30.

DETAILED DESCRIPTION OF THE INVENTION

Figure 1:
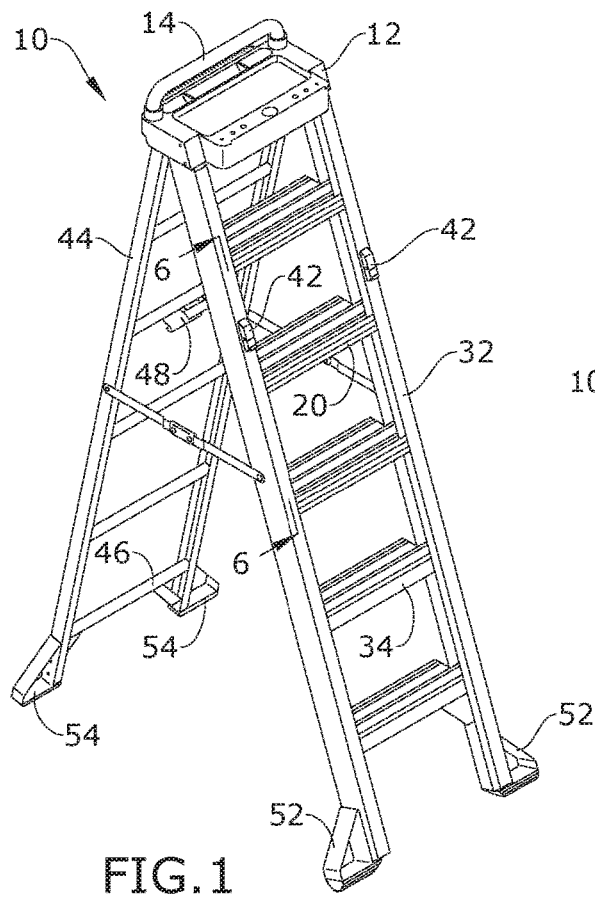
FIG. 1 is a perspective view of an exemplary embodiment of the present invention, illustrating a step ladder device 10 in a contracted position.
Figure 2:
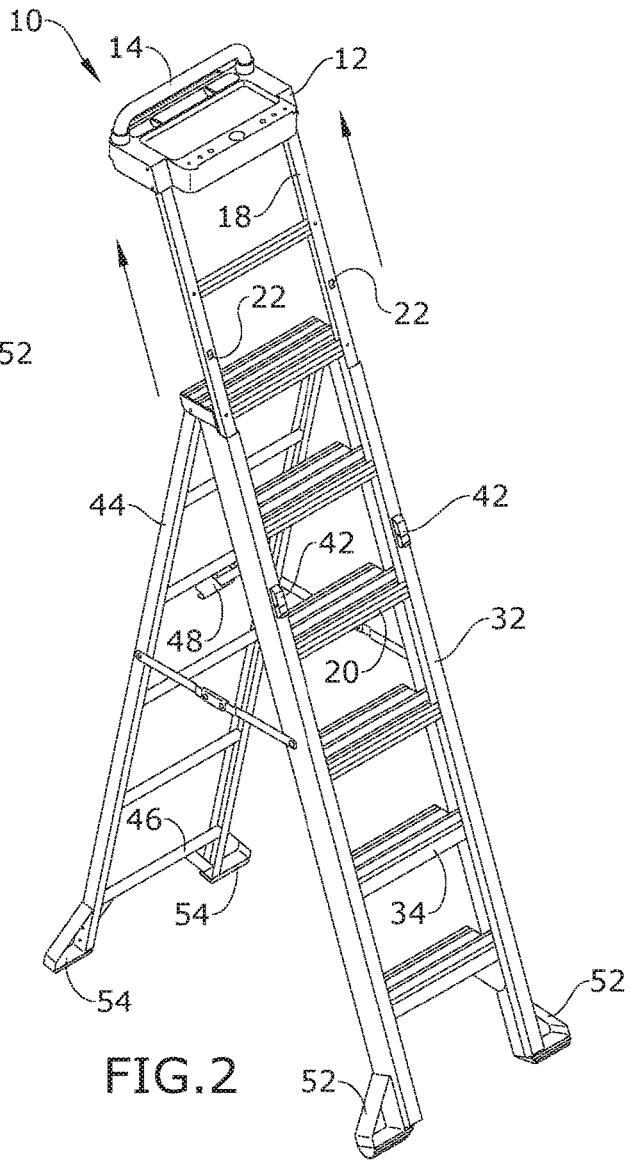
FIG. 2 is a perspective view of an exemplary embodiment of the present invention, illustrating the step ladder device 10 moving to an expanded position.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a step ladder device for improving the safe working elevation of a step ladder. The step ladder device includes a working ladder portion having in a working tray at a distal end. The working tray provides a rigidly connected safety grab bar. The step ladder device is dimensioned and adapted to piggyback on to the step ladder so that the working ladder portion slidably moves in a parallel orientation relative to the front legs of the underlying step ladder between a contracted position and a plurality of extended positions. The step ladder device also provides a locking element that, when combined with the slidable parallel movement, enables the working tray to have a selective working elevation relative to the underlying step ladder. As a result, while standing on the upper rungs of the underlying step ladder or the lower rungs afforded by the working ladder portion, the user can ergonomically utilize the working tray and embrace the safety grab bar.

It should be understood by those skilled in the art that the use of directional terms such as upper, lower, upward, downwardly, top, left, right and the like are used in relation to the illustrative embodiments as they are depicted in the FIGS. The upward direction (or upper) being toward the top of the corresponding FIGS., the downward direction being toward the bottom of the corresponding FIGS., while the front and rear direction are in reference to the base step ladder 30, where the front direction faces a user climbing the climbing steps 34 of the base step ladder 30.

Referring now to FIGS. 1 through 9, the present invention may include a step ladder device 10 dimensioned and adapted to operatively associate with or piggyback on a base step ladder 30. The step ladder device 10 provides an elongated frame 18 having in a working tray 12 rigidly attached to the distal end thereof. Rail extrusions 32 connect to the front base legs 64 of the base step ladder 30, enabling the movable piggybacking association of the step ladder device 10 and the base step ladder 30.

The base step ladder 30 provides front base legs 64 and rear base legs 44 movable relative to each other, scissor-like, between an open condition, illustrated in FIG. 1, and a closed condition as illustrated in FIG. 9. The rear base legs 44 may provide spaced apart rear cross bars 46, while the front base legs 64 provide spaced apart rungs or climbing steps 34 dimensioned and adapted to be climbed by a human user. A rear base leg 44 may provide a push-pull handle 48. The front base legs 64 and rear base legs 44 may be interconnected by a hinge 50 at approximately midpoint of their lengths. At their lower ends, the front base legs 64 and rear base legs 44 may terminate front feet 52 and rear feet 54, respectively. The front base legs 64 and rear base legs 44 may meet at a top rung 36.

Referring to FIG. 5, the elongated frame 18 supports spaced apart cross rungs 20, which are dimensioned and adapted to be climbed by a human user. The elongated frame 18 provides spaced apart frame locking holes 22.

Rail extrusions 32 may be joined to the front base leg 64 of the base step ladder 30. The elongated frame 18 slides through openings 33 of the rail extrusions 32, the openings 33 being adjacent the top rung 36, to operatively associate with the front base legs 64 so as to slide in a parallel orientation relative thereto between the contracted position and the plurality of extended positions increasing the functional elevations attainable by a user.

Figure 6:
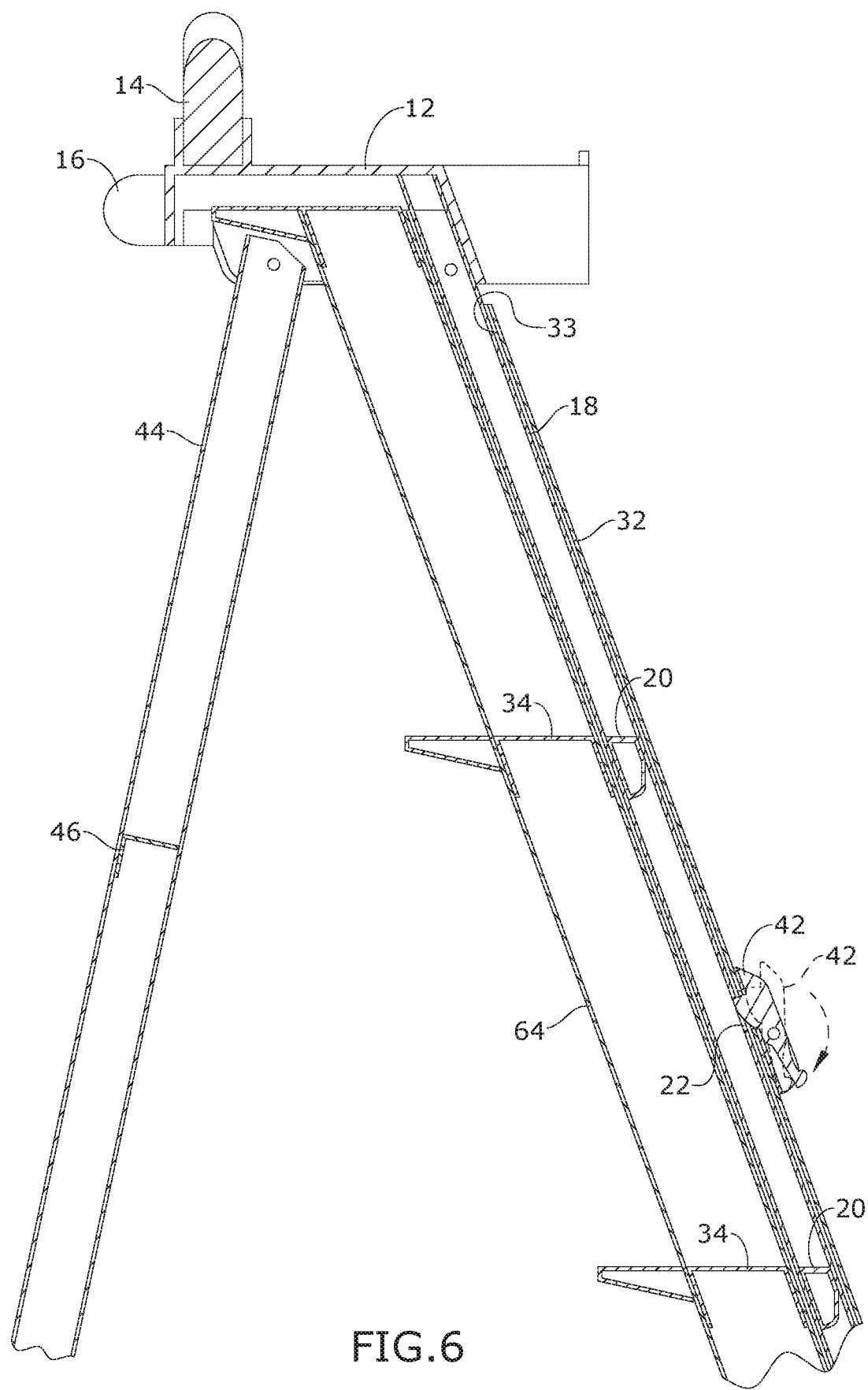
FIG. 6 is a section view of an exemplary embodiment of the present invention, taken along line 6-6 in FIG. 1, illustrating depression of lock tab 42 forming a locked engagement between a rail extrusion 32 and the elongated frame 18.

The rail extrusions 32 may also provide spaced apart rail lock holes 38 that align with the previously mentioned frame locking holes 22. At one or more rail lock holes 38 a lock bracket 40 may support a pivotable lock tab 42 that can move between a locked engagement and an unlocked engagement, as illustrated in FIG. 6. In certain embodiments, the locked engagement is unidirectional, due to the curved shape of the lock tab 42, so that only a downward direction of the elongated frame 18 is prevented.

The coplanar/parallel movement of the step ladder device 10 results in the fixed working tray 12 to be slidably raised to (and locked in) various extended positions in accordance with the user's desire for additional safety and working convenience. The working tray 12 elevation can be selectively controlled by the safety device 70, which may be unidirectional: adapted to prevent downward movement only, thereby enabling upward movement without the need to engage/unlock the safety device 70. Thus the use may merely push upward on the center of one of the rungs to increase the working elevation of the working tray 12 and grab bar 14, as opposed to having to reach for the periphery of the frame, which can cause the user to lose their balance or dangerously shift the center of gravity of the entire ladder system.

The working tray 12 provides a rigidly joined grab bar 14 so that when a user is working at or near the top climbing step 34 of the base ladder portion 10 or on a cross rung 20 of the elongated frame 18, the grab bar 14 attach to the working tray 12 provides a brace point for maintaining the user's stability. The working tray 12 provides an underside cavity for receiving the top rung 36 of the underlying base step ladder 30 in a nested condition. The working tray 12 may provide a bumper 16 along a rear side thereof so that when the base step ladder 30 is in the closed condition, the combination of the base step ladder 30 and the piggybacked step ladder device 10 can lean against a vertical surface, in a traditional ladder configuration, with the bumper 16 engaging said vertical surface, as illustrated in FIG. 9.

A method of using the present invention may include the following. The step ladder device 10 disclosed above may be provided. Either the step ladder device 10 is integrated to the base step ladder 30 during initial construction or piggybacked on to a preexisting base step ladder 30 by attaching the rail extrusions 32 as mentioned above. A user may unfold the base legs 44 and 64 into the open condition and elevate the working tray 12 by pushing any cross rung 20 until a desired locked engagement forms by way of the lock tab 42. A user may selectively elevate the working tray 12 and its grab bar 14 while on a climbing step 34, simply by singe-handedly pushing up any of the cross rungs 20. In certain embodiments, for safety reasons no more than three cross rungs 20 may go up, while the fourth rung may be stopped by a safety device (not shown).

To lower the working tray 12 the user must manipulate the lock tabs 42, typically located on the front of the rail extrusions 32, to move it to an unlocked engagement.

The rail extrusions 32 can be manufacturing during the creation of the base step ladder 30 or be separate components that are fixed to the base step ladder portion 10 later. In order to be able to use a rail extrusion 32, the base step ladder 30 must be straight up and not angled as most step ladders are. In order to compensate for the loss of stability caused by the lack of angles, the base step ladder 30 may have extension feet 52 and 54, as illustrated herein. These extension feet are equal to the angles, providing stability.

It should be understood, of course, that the foregoing relates to exemplary embodiments of the invention and that modifications may be made without departing from the spirit and scope of the invention as set forth in the following claims.

What is claimed is:

1. A step ladder system for improving a safe working elevation of a step ladder, comprising:
    a working ladder portion having an elongated frame extending between a proximal end and a distal end;
    a plurality of spaced apart cross rungs supported within the elongated frame;
    a working tray rigidly connected to the distal end;
    a grab bar fixed along an upper surface of the working tray;
    a cavity provided along a lower surface of the working tray; and
    a bumper provided along a front surface of the working tray.

2. The step ladder system for improving a safe working elevation of a step ladder of claim 1, further comprising:
    two rail extrusions dimensioned and adapted to attached along the step ladder and slidably receive the elongated frame.

3. The step ladder system for improving a safe working elevation of a step ladder of claim 2, further comprising:
    a plurality of frame lock holes in the elongated frame; and
    a lock tab located on each rail extrusion, each lock tab movable between an unlocked engagement and a locked engagement with one of the plurality of the frame lock holes preventing the elongated frame from moving downwardly but not upwardly.

4. A method of improving a safe working elevation of a step ladder, comprising:
    providing the step ladder having a front leg frame that terminates at a top rung;
    providing the step ladder system of claim 3; and
    attaching two rail extrusions to the front leg frame, one rail extrusion on each side thereof, wherein the elongated frame operatively associate with the two rail extrusions so that the working tray slidably moves in a parallel orientation relative to the front leg frame between a contracted position and one of a plurality of extended positions and wherein the top rung nests in the cavity in the contracted position.

* * * * *